United States Patent Office 3,097,213
Patented July 9, 1963

3,097,213
WARFARIN INTERMEDIATES
Charles Wiener, Linden, N.J., and Collin H. Schroeder and Karl Paul Link, Madison, Wis., assignors to Wisconsin Alumni Research Foundation, Madison, Wis., a corporation of Wisconsin
No Drawing. Filed May 2, 1962, Ser. No. 191,732
2 Claims. (Cl. 260—343.2)

The present invention relates to the anti-coagulant field and includes a new synthesis of the well-known anti-coagulant, warfarin, widely used, as such, in the rodenticide field and, as its sodium derivative, in the clinical field. See Link, K.P. and Ross, Ward, Pest Control, August 1956, and the New York Heart Association (New York Academy of Medicine) Lecture entitled "The Discovery of Dicumarol and Its Sequels," of February 25, 1958, by Karl Paul Link. Circulation, 19, No. 1, pages 97–107 (1959). See also Pollock, B.E., J.A.M.A. 161, 404 (1956), and Shapiro et al., J.A.M.A. 165, 1377 (1957).

A key intermediate in the synthesis is 2-amino-3-cyano-4-phenyl-5-oxo-γ-pyrano[3,2-c](1)benzopyran (1), prepared by condensing 4-hydroxycoumarin with benzylidene malononitrile and, which on acid hydrolysis, gives the desired 3(α-carboxymethylbenzyl)-4-hydroxycoumarin (II). Product (II) can be converted to warfarin through a key intermediate, 3-(α-chloroformylmethylbenzyl)-4-methoxycoumarin (V), as described in detail below, and also can be converted to the amide, 3-[α-(N-methylacetamido)benzyl]-4-hydroxycoumarin (VII), as described in Example VIII, and which also has anticoagulant properties. The following examples will serve to illustrate the invention.

EXAMPLE I 2-amino-3-cyano-4-phenyl-5-oxo-γ-pyrano[3,2-c](1)benzopyran (I).—To 50 ml. of pyridine were added 16.2 g. (0.1 mole) of 4-hydroxycoumarin and 15.4 g. (0.1 mole) of benzylidene malononitrile. The mixture was warmed to effect solution and kept at room temperature for an additional 30 minutes. Crystallization began spontaneously. After the addition of about 200 ml. of water the product was removed by filtration. It was washed on the filter with water, with two 50 ml. portions of 95% ethanol and with two 50 ml. portions of ether. It is colorless and base insoluble. Due to its insolubility in organic solvents recrystallization was difficult. Analytical samples were obtained by recrystallizing small amounts from large volumes of acetone, M.P. 273–275° C.

EXAMPLE II 3-(α-carboxymethylbenzyl)-4-hydroxycoumarin (II).—To a flask containing 150 ml. of glacial acetic acid and 25 ml. of concentrated hydrochloric acid was added 31.6 g. (0.1 mole) of the benzopyran product (I) of Example I. The mixture was refluxed for 3 hours and poured into an ice-water mixture. After several hours the oily product solidified and was collected by filtration. Recrystallization from 75% ethanol gave the desired product (II) with a M.P. 189–190° C. (dec.).

EXAMPLE III 3-(α-carbomethoxymethylbenzyl)-4-methoxycoumarin (III).—A solution of 25.0 g. of the product (II) of Example II in 100 ml. of methanol was slowly added to a cold ether solution of diazomethane (excess). After completion of the reaction (cessation of gas evolution) the excess diazomethane was decomposed by the addition of a small amount of glacial acetic acid. The ether-methanol solution was concentrated to dryness. The solid thus obtained was dissolved in ether, washed with two 100 ml. portions of 5% sodium hydroxide solution and finally with water. The ether solution was then dried over anhydrous magnesium sulfate, filtered and concentrated under vacuum. The crude, solid product thus obtained was recrystallized from a mixture of ethanol-water. Its M.P. was 121–123° C.

EXAMPLE IV 3-(α-carboxymethylbenzyl)-4-methoxycoumarin (IV).—To a mixture of 50 ml. of 95% ethanol, 15 g. of sodium hydroxide and 50 ml. of distilled water was added 10.0 g. (0.029 mole) of the product (III) of Example III. The solution was refluxed for one hour. After cooling, the reaction mixture was poured into ice and water. The oily product solidified on standing. Recrystallization from ethanol gave the desired product with a M.P. of 189–191° C. after drying at 80° C. for 12 hours at 0.5 mm.

EXAMPLE V 3-(α-chloroformylmethylbenzyl)-4-methoxycoumarin (V).—To a solution of 5.0 g. (0.015 mole) of the product (IV) of Example IV in 100 ml. of anhydrous benzene was added 3.5 g. (0.017 mole) of phosphorus pentachloride. The reaction mixture was warmed to initiate reaction and allowed to stand at room temperature for 30 minutes. The benzene was removed under vacuum to a volume of about 25 ml. Anhydrous benzene (25 ml.) was added to the reaction mixture and again concentrated to a volume of 25 ml. This procedure was repeated an additional two times to ensure complete removal of the phosphorus oxychloride. Dry solvent naphtha (Skellysolve-B) was added to incipient turbidity. Crystallization took place after standing several hours at 4° C., yielding the desired product was a M.P. 95–96° C.

EXAMPLE VI 3-(α-acetonylbenzyl)-4-methoxycoumarin (VI).—To a benzene solution (30 ml.) containing 2.7 g. (0.015 mole) of dimethyl cadmium was added 5.3 g. (0.015 mole) of the product (V) of Example V with mechanical stirring. The reaction mixture was refluxed for 15 minutes and transferred to a separatory funnel containing 100 ml. of water and 25 ml. of ethyl acetate. The reaction vessel was washed with an additional 25 ml. of ethyl acetate.

The solvent layer was washed with two 100 ml. portions of water, two 50 ml. portions of 5% sodium hydroxide solution and two 100 ml. portions of water. After drying the organic layer over anhydrous magnesium sulfate the solvent was removed under vacuum. The dark-colored oil was dissolved in a minimum amount of methanol and decolorized with activated charcoal (Darco KB).

The methanol solution was kept at 4° C. for several days. The resulting crystalline product was removed by filtration and recrystallized from methanol, to give the desired product with a M.P. of 125–7° C.

EXAMPLE VII

*Warfarin.*—To a mixture of 5 ml. of glacial acetic acid and 5 ml. of 48% aqueous hydrobromic acid was added 0.5 g. of the product (VI) obtained above. The mixture was refluxed one hour and poured into 50 ml. of an ice-water mixture. The dark-colored solid was removed by filtration, washed with water and dissolved in 25 ml. of 10% sodium hydroxide solution. The alkaline solution was decolorized with activated charcoal (Darco KB). After removing the charcoal, the alkaline solution was acidified with concentrated hydrochloric acid. The semi-solid material was separated from the mother liquor by decantation. The crude material was dissolved in an acetone-water mixture and kept at 4° C. for several days. Needle-like crystals separated. They were recrystallized from an acetone-water mixture. The product had an M.P. of 160–161° C. The M.P. of a mixture of this material and an authentic specimen of warfarin was not depressed. The infrared spectrum of the product as obtained and that of authentic warfarin were identical.

EXAMPLE VIII

*3-[α-(N-methylacetamido)benzyl]-4 - hydroxycoumarin (VII).*—To a flask fitted with a water separator was added 250 ml. of benzene and 6.1 g. (0.01 mole) of the product (II) of Example II dissolved in 5 ml. of 25% aqueous methylamine. The mixture was refluxed until water no longer separated. The insoluble product was removed by filtration. It was finely powdered and placed in a small round-bottomed flask and heated under vacuum (12 mm.) at 150–160° C. for 1.5 hours.

The crude product was removed from the flask, powdered and washed with water. After recrystallization from absolute ethanol the M.P. was 247–250° C.

In attempts to make the amide (VII) from the acid chloride of product (II), it was found that the desired intermediate acid chloride could not be obtained as cyclization of product (II) occurred yielding 2,5-dioxo-3H-4-phenyl-γ-pyranol[3,2-c](1)benzopyran. However, it was discovered that the amide (VII) could be obtained in good yield by dehydration of the methylammonium salt of (II) as described above in Example VIII.

The formulas of the key intermediates I and V noted above can be illustrated as follows:

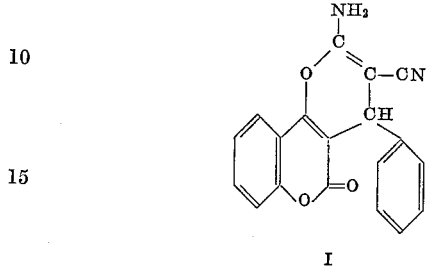

I

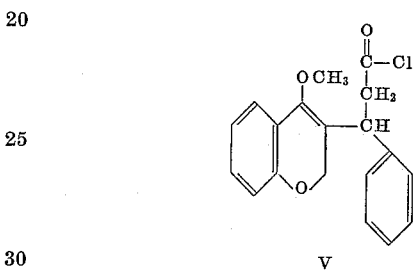

V

We claim:
1. 2-amino-3-cyano-4-phenyl-5-oxo-γ-pyrano[3,2-c](1)benzopyran.
2. 3-(α-chloroformylmethylbenzyl)-4 - methoxycoumarin.

No reference cited.